United States Patent

Polka

[11] Patent Number: 5,366,279
[45] Date of Patent: Nov. 22, 1994

[54] OIL HUB COVER FOR TRUCK WHEELS

[76] Inventor: John G. Polka, 1355 Margate, Libertyville, Ill. 60048

[21] Appl. No.: 145,148

[22] Filed: Nov. 3, 1993

[51] Int. Cl.⁵ .............................................. B60B 7/00
[52] U.S. Cl. ................................. 301/108.1; 301/37.1
[58] Field of Search .................. 301/37.1, 108.1, 108.2, 301/108.3, 108.4, 108.5

[56] References Cited

U.S. PATENT DOCUMENTS

| | | | |
|---|---|---|---|
| 310,332 | 1/1885 | Taylor | 301/108.5 |
| 1,943,159 | 1/1934 | Booth | 301/108.5 |
| 3,393,015 | 7/1968 | Kaufman | 301/108.1 |
| 3,642,327 | 2/1972 | Walther | 301/108.1 |
| 3,893,690 | 7/1975 | Yapp | 301/108.3 |

*Primary Examiner*—Russell D. Stormer
*Attorney, Agent, or Firm*—Patnaude, Videbeck & Marsh

[57] ABSTRACT

A cover for an oil hub extending through a truck wheel has a tubular body with a transverse surface at one end thereof. The inner diameter of the tubular body is a little greater than the outer diameter of the cylindrical section of the oil hub around which the body is fitted. A compressible sleeve, typically made of a foam rubber or the like, has an inner diameter a little less than the outer diameter of the cylindrical section of the oil hub, and has an outer diameter which is larger than the inner diameter of the tubular body of the cover. The cover is retained over the compressable sleeve by the radial force of the sleeve and by a double sided tape which is applied to the outer surfaces of the compressible sleeve and across the distal end of the oil hub.

5 Claims, 2 Drawing Sheets

OIL HUB COVER FOR TRUCK WHEELS

The present invention relates to decorative coverings for wheels, and particularly to a cover for an oil hub of the type which extends from the axle of a truck wheel and around which the wheel is fitted.

BACKGROUND OF THE INVENTION

The rear wheels of trucks typically have a cylindrical section around which a tire is secured and a generally planar web section which is transverse to one end of the cylindrical section. The planar section has a centrally located opening for receiving the oil hub of a truck axle, and surrounding the central opening is a plurality of spaced holes for receiving a plurality of lugs mounted around the end of the axle for retaining the wheel. The oil hub at the end of the axle extends through the central opening of the wheel and is readily visible from the exterior thereof.

To improve the appearance of the central portion of such truck wheels, a cover having a cylindrical section with a transverse outer end can be fitted over the oil hub with the cylindrical section of the cover fitted around the sides of the oil hub. Such covers have previously been attached by an exterior flange at the wheel end thereof which has a plurality of spaced holes positioned such that they can be aligned with the threaded studs used to retain the wheel to the hub. The cover is retained by the lug nuts which retain the wheel to the axle.

The laws of certain states require that trucks travelling across the roads of the state be stopped and the wheels thereof inspected for, among other things, cracks in the web portion of the wheels. When portions of such wheels are covered by a wheel cover having an exterior flange and retained by the lug nuts which retain the wheel, the web portion of the wheel near the central opening, and surrounding the retaining studs cannot be inspected without first removing the decorative cover. However, to properly attach a wheel of a truck, the lug nuts must be tightened with a great amount of torque and cannot be loosened without proper tools which are not available on the open road. A truck fitted with an oil hub cover having an exterior flange must, therefore, be routed off the road to a suitable service station in order that the required inspection be made.

It would be desirable to provide an oil hub cover for a truck wheel which can be securely attached to a truck axle without requiring an exterior flange attached to the studs of the axle such that truck's wheels fitted with the cover can be inspected without requiring removal of the lug nuts.

SUMMARY OF THE INVENTION

Briefly, the present invention is embodied in a cover for an oil hub of a truck wheel where the oil hub has a cylindrical section of a given diameter. The cover includes a tubular body with a transverse surface at one end thereof, and the inner diameter of the tubular body is a little greater than the outer diameter of the cylindrical section of the wheel hub. A compressible sleeve is also provided which is typically made of a foam rubber or the like, which has an inner diameter a little less than the outer diameter of the cylindrical section of the oil hub, and has an outer diameter which is larger than the inner diameter of the tubular body of the cover.

To assemble the cover to the wheel, the compressible sleeve is fitted over the cylindrical section of the oil hub and the tubular body of the cover fitted around the outer surface of the sleeve. The cover may be further retained by a double sided tape which is applied to the outer surfaces of the compressible sleeve and across the distal end of the oil hub after the sleeve has been fitted around the oil hub. The tape will further retain the tubular body to the compressible sleeve.

An oil hub cover in accordance with the present invention can be attached or removed without removing the lug nuts retaining the wheel to the axle of the truck. Furthermore, the web portion of the wheel which surrounds the studs for retaining the wheel to the axle, and the portion surrounding the central opening of the wheel can all be inspected without the removal of an oil cover in accordance with the present invention.

GENERAL DESCRIPTION OF THE DRAWINGS

A better understanding of the present invention can be had by a reading of the following detailed description taken in conjunction with the accompanying drawings wherein.

DETAILED DESCRIPTION OF THE PREFERRED EMBODIMENT

Figure 1:
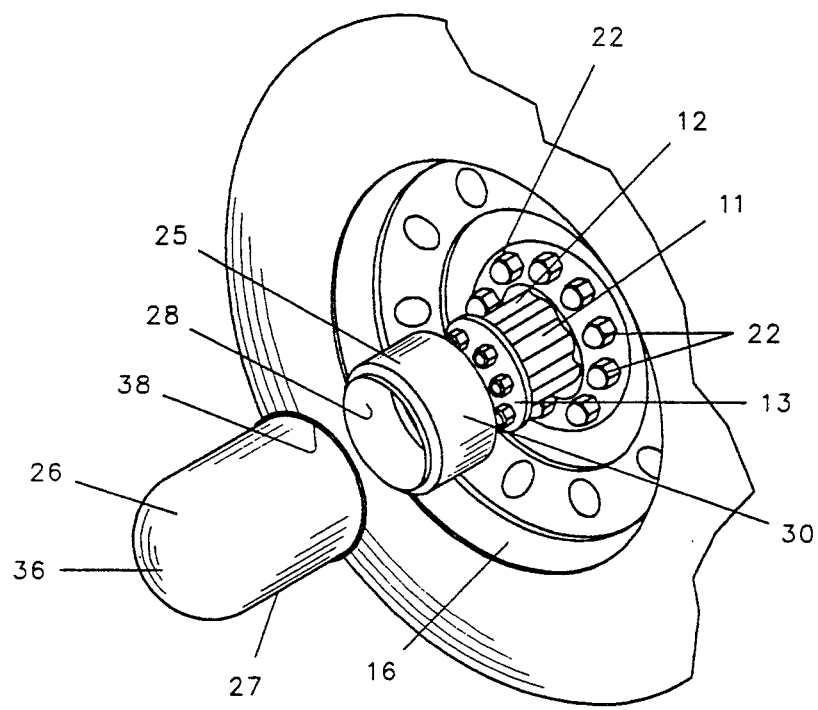
FIG. 1 is an exploded isometric view of a truck wheel having an oil hub and an oil hub cover embodying the present invention.
Figure 2:
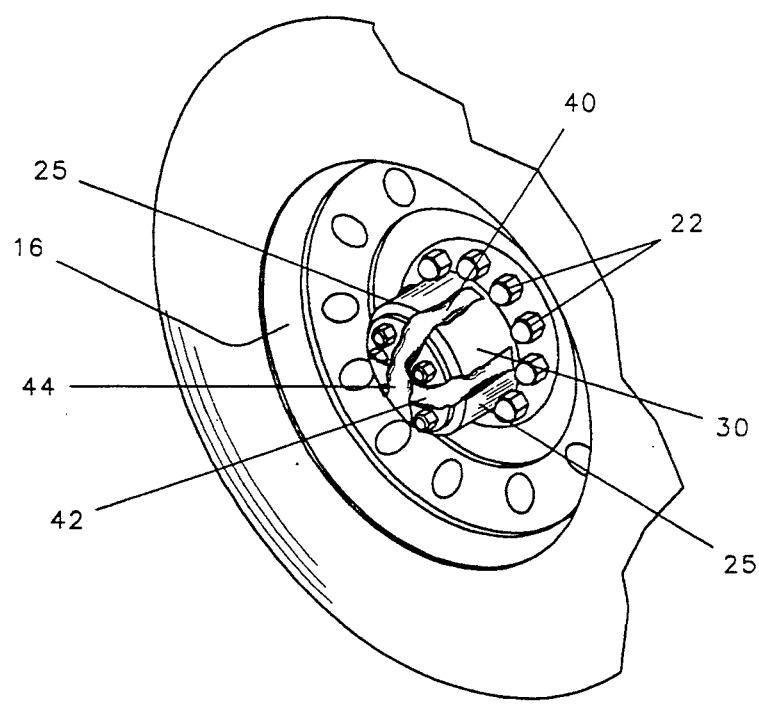
FIG. 2 is an isometric view of the truck wheel in FIG. 1 with the compressible sleeve as shown in FIG. 1 fitted around the circumference of the hub and tape attached thereto.
Figure 3:
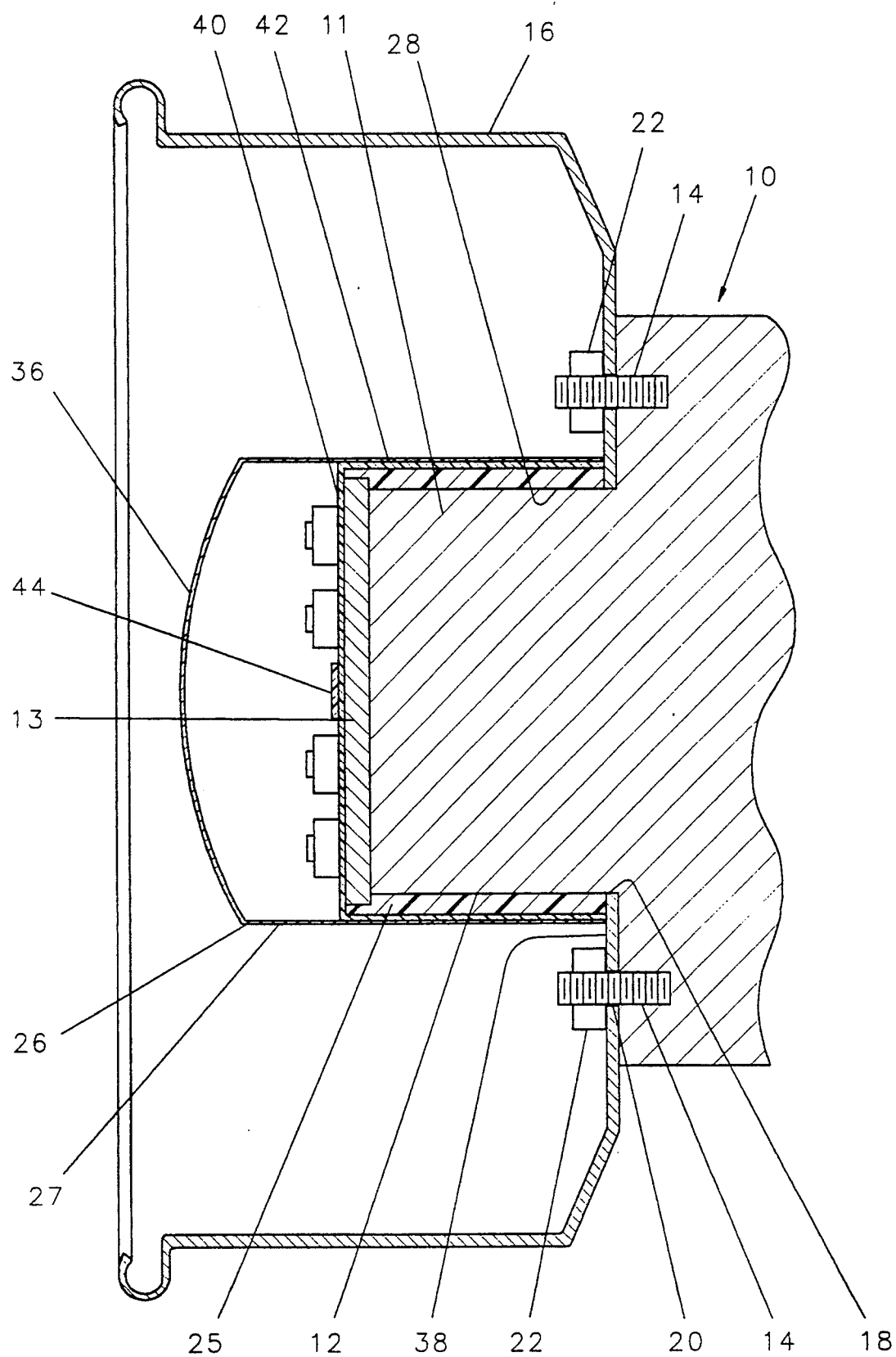
FIG. 3 is a cross-sectional view of a truck axle and oil hub having the oil hub cover shown in FIG. 1 attached thereto.

Referring to FIGS. 1, 2 and 3, a typical truck axle 10 has a centrally located oil hub 11 which has a generally cylindrical section 12 and at the distal end thereof an oil cover 13. Surrounding an inner portion of the cylindrical section 12 is a plurality of parallel spaced studs 14. A truck wheel 16 has a central opening 18 surrounded by a plurality of spaced holes 20 aligned to receive the studs 14 when the central opening 18 is fitted around the oil hub 12 as best shown in FIG. 3. The wheel 16 is then retained on the axle 10 by lug nuts 22 which are tightly secured to the studs 14.

As best seen in FIG. 3, the cylindrical section 12 of the oil hub 11 has a given diameter which is less than the diameter of the central opening 18 of the wheel, and the cylindrical section 11 extends outward of the studs 14 used to retain the wheel 16. A wheel hub cover in accordance with the present invention includes a compressible sleeve 25 which is typically made of a foam rubber or the like and a metal cover 26 having a tubular body 27. The sleeve 25 has an inner surface 28 the diameter of which is less than the given diameter of the cylindrical section 12 of the oil hub 11 and an outer surface 30, which in the preferred embodiment has a diameter which is larger than the outer diameter of the cylindrical section 12 of the oil hub 11. When the sleeve 25 is fitted over the cylindrical section 11 of the oil hub, as shown in FIG. 2, the inner surface 28 of the sleeve 25 is expanded, thereby partially compressing the material of the sleeve 25. The sleeve 25 should be approximately as long as the length of the cylindrical sections 12 of the oil hub 11 which extends through the central opening 18 of a wheel 16.

The cover 26 has a transverse surface 36 at one end of the tubular body 27 and the transverse surface 36 typically has a dome shape. The length of the tubular body 12 must be a little longer than the length of the cylindrical section 12 of the oil hub 11 which extends through the central opening 18 of the wheel 16, and the inner diameter of the tubular body 27 must be a little larger than the outer diameter of the cylindrical section 12 of the oil hub 11.

Typically, the hub cover 26 may be stamped of a steel and have a chrome coating to provide an attractive exterior appearance. At the end of the tubular body 27 opposite the transverse surface 36 is an annular bead 38. In the preferred embodiment, prior to fitting the hub cover 26 on the compressible sleeve 25, a double sided tape 40 is attached to the exterior surface of the oil cover 13 and the outer surface 30 of the compressible sleeve 25. As shown in FIG. 2, two lengths of tape will adequately retain the cover 26 to the compressible sleeve 25. A first length 42 is attached across the oil cover 13 of the oil hub 11 with the ends of the length 42 extending along the outer surface 30 of the sleeve 25 parallel to the axis of the axle 10. Thereafter, a second length 44 of tape 40 is also attached across the oil cover 13 of the oil hub 11 with the ends extending along the outer surface 30 of the sleeve 26, but perpendicular to the orientation of the first length 42. After attachment of the double sided tape 40 the hub cover 26 may be fitted over the outer surface 30 of the compressible sleeve 25 thereby further compressing the material of the sleeve 25. When the cover 26 is attached to the oil hub 11, the bead 38 will be fitted against the outer surface of the wheel 16.

The hub cover 26 as described above will be retained on the oil hub 11 by the radial compressive forces created when the sleeve 25 is compressed by the hub cover 26 fitted thereon, and by the double sided tape 40. The annular bead 38 provides decorative border at the distal end of the cover, but it does not cover the portion of the wheel 16 which is fitted around the studs 14 and, therefore, that portion of the wheel 16 can be inspected without removing the hub cover 25.

While the present invention has been described in connection with a single preferred embodiment, it will be understood by those skilled in the art that many changes and modifications may be made without departing from the true spirit and scope of the present invention. It is therefore intended by the appended claims to cover all such changes and modifications which come within the true spirit and scope of the invention.

What is claimed:

1. A cover for an oil hub of a wheel having a given outer diameter comprising in combination:
   a tubular body having a transverse surface at one end thereof,
   said tubular body have an inner diameter which is greater than said outer diameter of said oil hub,
   a compressible sleeve for fitting over said oil hub and within said tubular body, and,
   a retaining means positioned over an outer surface of said sleeve and within an inner surface of said tubular body.

2. The method of covering an oil hub of a wheel comprising the steps of:
   positioning a compressible sleeve over said oil hub,
   positioning a cover having a cylindrical body and a transverse end over said compressible sleeve and,
   compressing said compressible material of said sleeve as said cylindrical body is positioned over said sleeve.

3. The method of claim 2 and further comprising the step of
   applying an adhesive material to an outer surface of said sleeve prior to positioning said cover over said sleeve.

4. A cover for an oil hub of a wheel having a given outer diameter comprising in combination:
   a tubular body having a transverse surface at one end thereof,
   said tubular body having an inner diameter which is greater than said outer diameter of said oil hub.
   a compressible sleeve for fitting over said oil hub and within said tubular body, and
   a compressible sleeve having an inner diameter and an outer diameter, said inner diameter of said sleeve less than said given outer diameter of said oil hub and said outer diameter of said sleeve greater than said inner diameter of said tubular body, said compressible sleeve for fitting over an oil hub and within said tubular body.

5. The method of covering an oil hub of a wheel compressing the steps of:
   positions a sleeve over said oil hub,
   applying an adhexive material to an outer surface of said sleeve, and
   positioning a cover having a cylindrical body and a transverse end over said compressible sleeve.

* * * * *